UNITED STATES PATENT OFFICE.

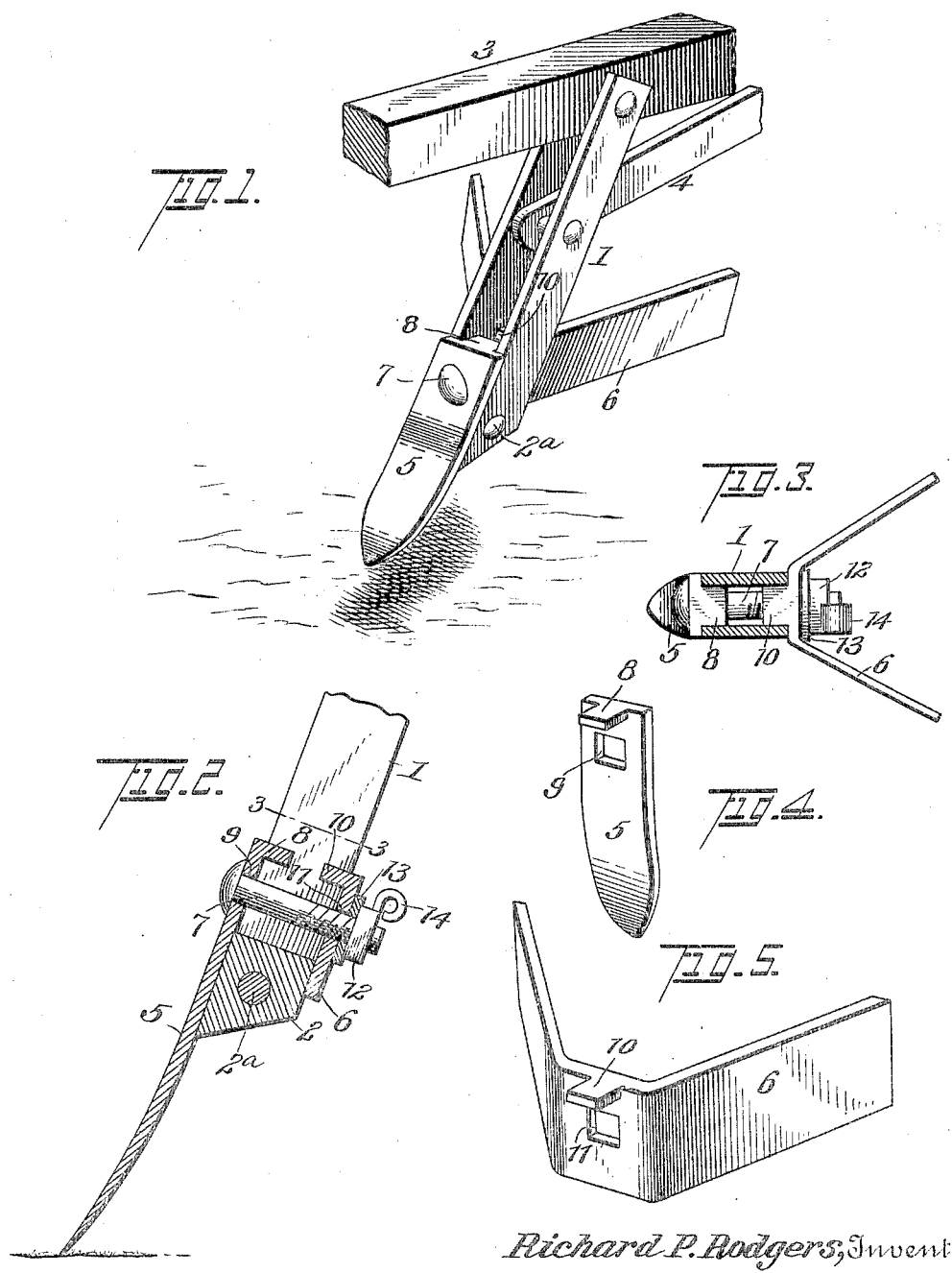

RICHARD P. RODGERS, OF SPARTANBURG, SOUTH CAROLINA.

PLOW.

No. 802,322.  Specification of Letters Patent.  Patented Oct. 17, 1905.

Application filed June 7, 1905. Serial No. 264,120.

*To all whom it may concern:*

Be it known that I, RICHARD P. RODGERS, a citizen of the United States, residing at Spartanburg, in the county of Spartanburg and State of South Carolina, have invented a new and useful Plow, of which the following is a specification.

The invention relates to improvements in plows.

The object of the present invention is to improve the construction of plows, more especially the means for attaching the shovel or blade and the heel-sweep to the plow foot or standard, and to provide a simple and comparatively inexpensive construction of great strength and durability in which a single bolt will securely fasten the shovel or blade and the heel-sweep to the foot or standard.

With these and other objects in view the invention consists in the construction and novel combination and arrangement of parts hereinafter fully described, illustrated in the accompanying drawings, and pointed out in the claim hereto appended, it being understood that various changes in the form, proportion, size, and minor details of construction within the scope of the claim may be resorted to without departing from the spirit or sacrificing any of the advantages of the invention.

In the drawings, Figure 1 is a perspective view of a portion of a plow constructed in accordance with this invention. Fig. 2 is a vertical sectional view of the same. Fig. 3 is a sectional view on the line 3 3 of Fig. 2. Fig. 4 is a detail perspective view of the shovel or cultivator-blade. Fig. 5 is a similar view of the heel-sweep.

Like numerals of reference designate corresponding parts in all the figures of the drawings.

1 designates a plow foot or standard having a longitudinal opening and preferably composed of two side bars and a spacing block or piece 2, located at the lower ends of the bars and secured between the sides or bars by a transverse bolt 2$^a$; but the plow foot or standard may be constructed in any other desired manner, as will be readily understood. The upper ends of the sides of the plow foot or standard are designed to be secured to a plow-beam 3 in any desired manner, and a brace 4 is preferably provided for holding the plow foot or standard rigid with the plow-beam and at the desired angle or inclination.

The lower portion of the plow foot or standard receives a shovel or blade 5 and a heel-sweep 6, which are secured to the plow foot or standard by a heel-bolt 7. The cultivator blade or shovel 5, which may be of any desired construction, fits against the lower portion of the plow foot or standard at the front thereof and is arranged at an inclination. The upper end of the shovel or blade is provided with an integral flange or lug 8, which fits snugly within the space between the sides of the foot or standard and which is of a width less than the width of the upper portion or shank of the cultivator blade or shovel 5. The upper portion of the cultivator blade or shovel is also provided with an opening 9 for the reception of the heel-bolt 7, which has its head arranged at the outer or front face of the blade or shovel.

The heel-sweep is composed of two sides or wings which extend laterally from opposite sides of the foot or standard and diverge rearwardly therefrom. The front of the heel-sweep is provided at its upper edge with an integral forwardly-projecting lug or flange 10, located directly opposite the lug or flange 8 of the cultivator blade or shovel. The lugs 8 and 10 are located in the same transverse plane, as clearly illustrated in Fig. 2 of the drawings, and the heel-sweep is provided with an opening 11, through which the heel-bolt passes. The bolt is provided at its rear end with a nut 12, and a washer 13 is preferably interposed between the nut and the rear face of the heel-sweep. The nut has a projecting portion 14 to assist in turning it; but it may be constructed in any other desired manner, as will be readily understood. The projecting lugs or flanges, which are located above the heel-bolt 7, prevent the cultivator blade or shovel and the heel-sweep from turning, and a single bolt is sufficient to hold the blade or shovel and the heel-sweep firmly and securely on the lower portion of the foot or standard.

It will be seen that the means for mounting the cultivator blade or shovel and the heel-sweep on the plow foot or standard are exceedingly simple and inexpensive in construction, that the structure is one of great strength and durability, and that it will enable the cultivator blade or shovel and the heel-sweep to be quickly applied to and removed from the foot or standard. It will also be clear that the fastening device which connects the cultivator blade or shovel and the heel-sweep serves to secure those parts to the foot or standard and that to this extent those parts are self-supporting.

Having thus fully described my invention, what I claim as new, and desire to secure by Letters Patent, is—

The combination with a foot or standard having an opening, of a cultivator blade or shovel fitted against the front of the foot or standard and provided with a bolt-opening and having a projecting lug or flange fitting within the opening of the foot or standard, a heel-sweep having an opening and also provided with a lug or flange extending into the opening of the foot or standard, and a heel-bolt passing through the opening of the foot or standard and through the opening of the blade or shovel and the heel-sweep, the said lugs or flanges being arranged to prevent the cultivator blade or shovel and the heel-sweep from turning on the heel-bolt.

In testimony that I claim the foregoing as my own I have hereto affixed my signature in the presence of two witnesses.

RICHARD P. RODGERS.

Witnesses:
 W<small>M</small>. M. J<small>ONES</small>,
 S. J. N<small>ICHOLLS</small>.